United States Patent [19]
Shields, Jr.

[11] 4,050,794
[45] Sept. 27, 1977

[54] FILM-SOUND SYNCHRONIZATION SYSTEM

[76] Inventor: James R. Shields, Jr., R.D. 4, Canastota, N.Y. 13032

[21] Appl. No.: 549,770

[22] Filed: Feb. 13, 1975

Related U.S. Application Data

[63] Continuation-in-part of Ser. No. 420,627, Nov. 30, 1973, abandoned.

[51] Int. Cl.$^2$ .............................................. G03B 31/00
[52] U.S. Cl. ........................................ 352/12; 352/13; 352/21; 352/31
[58] Field of Search ...................... 352/12, 13, 21, 31, 352/14

[56] References Cited

U.S. PATENT DOCUMENTS

| | | | |
|---|---|---|---|
| 1,605,529 | 11/1926 | Case | 352/31 |
| 2,503,083 | 4/1950 | Waller | 352/17 |
| 2,982,172 | 5/1961 | Berkenhoff | 352/14 |
| 3,207,033 | 9/1965 | Guber | 352/12 |
| 3,244,469 | 4/1966 | Hennessey | 352/14 |
| 3,429,640 | 2/1969 | Machtig | 352/12 |
| 3,594,077 | 7/1971 | Marquis | 352/31 |
| 3,694,060 | 9/1972 | Tadie | 352/14 |

*Primary Examiner*—Monroe H. Hayes
*Attorney, Agent, or Firm*—Charles S. Mc Guire

[57] ABSTRACT

A system for synchronizing projection of a movie film with playback of a sound recording made simultaneously with filming of the movie by simple and economical adapter means compatible with existing camera, projector and sound equipment without substantial modification. The invention utilizes "home movie" type camera and projector equipment, with a tape recorder-playback unit as the sound system. The camera is powered from a power supply having a switch operated by the "play" button of the tape recorder, thereby starting and stopping operation of the camera and tape unit simultaneously during filming and recording. The tape drive motor is powered from a selectively controllable voltage supply, and is not connected to the supply through the normal electrical system of the tape unit, as is conventional. Momentary switches in the lines of each of the projector and tape drive motor are provided to allow the operator to interrupt power to either for a short period to restore synchronism in one disclosed embodiment. In another embodiment, synchronism is restored during projection and sound playback by either speeding up or slowing down the tape drive motor. Also disclosed are means for starting the tape unit for playback in synchronism with the beginning of film projection either manually or automatically.

18 Claims, 5 Drawing Figures

FILM-SOUND SYNCHRONIZATION SYSTEM

REFERENCE TO RELATED APPLICATION

This is a continuation-in-part of co-pending application Ser. No. 420,627, filed Nov. 30, 1973, now abandoned.

BACKGROUND OF THE INVENTION

The present invention relates to synchronizing playback of a movie film and sound recorded on a record medium separate from the film at the time of photographing.

In the years since moving picture cameras and projectors and sound recording apparatus have been technically and economically within the means of amateurs, various means have been proposed for achieving more or less exact synchronization of the sound and picture as they are played back and projected together. Since the camera, projector and recorder/playback unit are driven by separate motors, some of which may be DC and others AC operated, rather wide discrepancies between sound and picture can develop during the course of playback even though the two are synchronized at the outset.

Prior systems which provide good synchronization of separately recorded sound and film have generally required special equipment incorporating the synchronizing features. That is, rather than utilizing equipment which the amateur user may already own, a special camera, projector and/or recorder-playback units must be purchased. Systems using electronic timing controls such as pulse generators, counters and logic circuits will obviously be quite expensive and therefore, to some extent, defeat the purpose of providing economical equipment.

A principal object of the present invention is to provide a sound movie system utilizing existing camera, projector and sound recording and playback equipment with relatively simple, inexpensive modifications while achieving good synchronization of sound and picture.

A further object is to provide means for synchronizing the projection of a silent moving picture with playback of a tape recording made simultaneously with filming of the movie which is extremely simple and economical and includes means for making selective manual adjustments of synchronism during playback.

Other objects will in part be obvious and in part appear hereinafter.

SUMMARY OF THE INVENTION

In accordance with the foregoing objects, the present invention is designed to utilize existing silent movie camera and projector apparatus, such as 8mm "home movie" type, currently in wide use by amateur photographers. Virtually all cameras of this type are operated by a 6 volt DC power supply provided by batteries mounted in the camera. In the present invention, the camera is operated either from house current (nominally 100v-125v AC) which is rectified to DC and stepped down to 6v, or directly from a DC source, in either case through an adapter unit connected to the terminals of the camera. The projector is operated for playback of the developed film from a similar house current source.

As the movie is filmed, sound is recorded on a magnetic tape recorder, either reel or cassette type, also of a design currently in widespread use. The recording and sound section of the unit is powered directly by the AC source, but tape drive is provided from a motor connected to the AC source, through a variable AC autotransformer, separately from the recording and sound section. Motor speed may be varied by adjustment of the voltage provided to the motor without affecting the recording and sound stage.

The camera and recorder are started and stopped simultaneously by a switch in the camera power supply line which is opened and closed in response to manual actuation of the keys which start and stop the recorder unit. A pair of manually operable, normally closed switches are provided to allow momentary interruption of the power supply to the projector and the recorder unit. These switches may be used during playback to allow selective adjustment of the film and tape positions to restore synchronism in the event of minor drifts tending to create an out-of synch condition.

The invention is also disclosed in another embodiment wherein a single, manually operable switch may either speed up or slow down the rate of sound playback without disturbing the projection. Means are also shown in connection with this embodiment for interrupting the sound when the tape driven is operating at other than normal speed, and for automatically starting playback of the sound in synchronism with the beginning of film projection.

DETAILED DESCRIPTION

Figure 1:
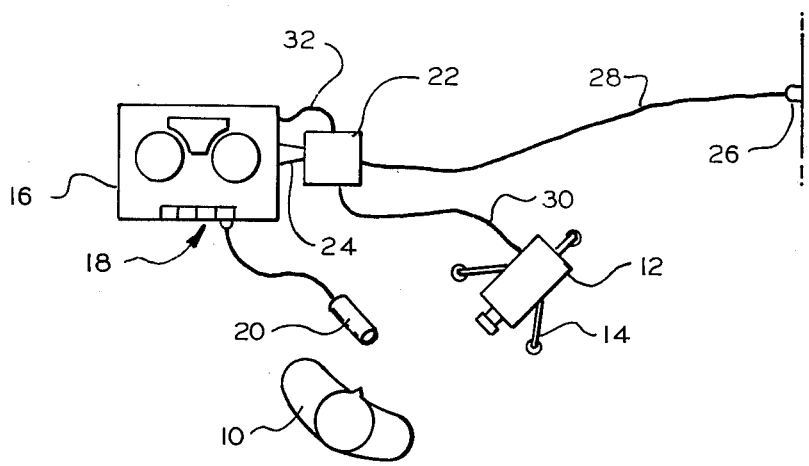
FIG. 1 is a general illustration of the major components during the filming-recording operation.

Referring now to the drawings, in FIG. 1 is shown a subject 10 of whom a motion picture is taken simultaneously with recording of sound, such as a verbal message delivered by the subject. Motion picture camera 12 is focused on the subject and may be hand-held by another person or supported on tripod 14. Camera 12 may be any well-known design of non-sound movie camera, such as the many common 8mm "home movie" cameras, having a film and shutter drive powered by a DC motor within the camera.

Magnetic tape record/playback unit 16 is also of standard design, having control keys 18 for record, play, rewind, stop, etc. Microphone 20 is connected to unit 16 by an appropriate plug and jack to pick up sounds for recording on the magnetic tape in known manner. Unit 16 are illustrated as a reel-to-reel type unit, but may, of course, be of the cassette or any other desired type. In fact, a record medium other than magnetic tape may be utilized but the invention is shown in the context of apparatus with which most amateurs are familiar. The electrical system for amplifying, recording and playing the sounds is contained within the housing of unit 16 and, being of conventional design, is not illustrated in detail. Such systems include elements for converting audible sounds to electrical signals which may be recorded on the record medium, and vice versa.

A motor for driving the tape past the record/playback head in unit 16 receives electrical power through the aforementioned electrical system of the recording and sound stage in conventional units of this type. In the present invention, the motor driving the tape receives power instead from a regulated voltage supply, connected to the source other than in the conventional manner through the unit's electrical system. The motor may be, and preferably is, contained within the housing of unit 16 but in order to stress the fact that the tape drive motor is not connected in the usual manner it is illustrated as being part of a separate adapter unit 22 and connected to the tape drive idler wheel by belt 24. In fact, all components of adapter unit 22, details of which will be disclosed later, may be contained within the housing of unit 16 if desired. Ordinary household current (100v–125v AC, 60 cycle) is provided at an outlet through plug 26 and line 28 to adapter unit 22. The latter is connected by line 30 to camera 12, and by line 32 to unit 16, during filming and recording.

Figure 2:
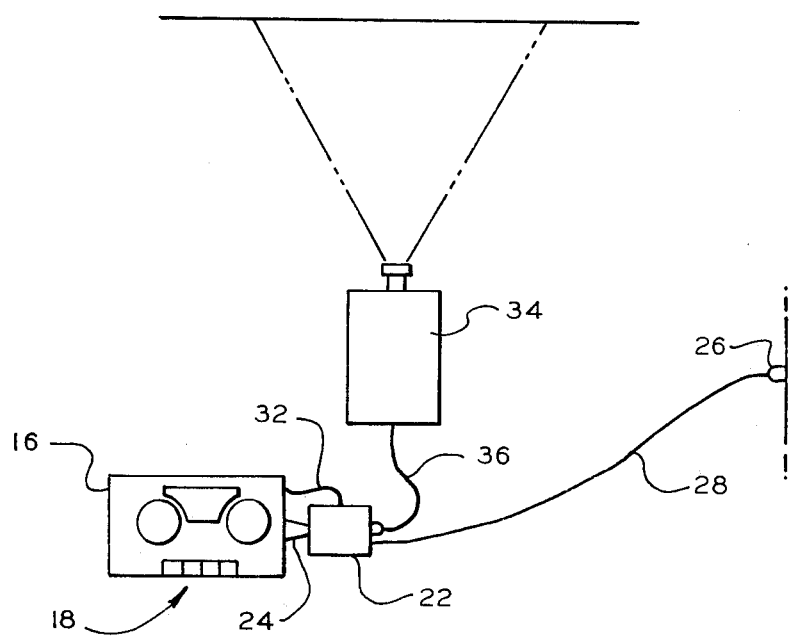
FIG. 2 is a general illustration of the major components during the projection-playback operation.

In FIG. 2 is shown the general arrangement of the units when the film is projected and the sound played back. Adapter unit 22 is again connected to the AC source through line 28 and to tape unit 16 through line 32. Belt 24 connects the drive motor within unit 22 to the tape drive idler wheel in unit 16. Projector 34, of conventional design, is plugged into a receptacle on adapter unit 22, being connected thereto by line 36.

Figure 3:
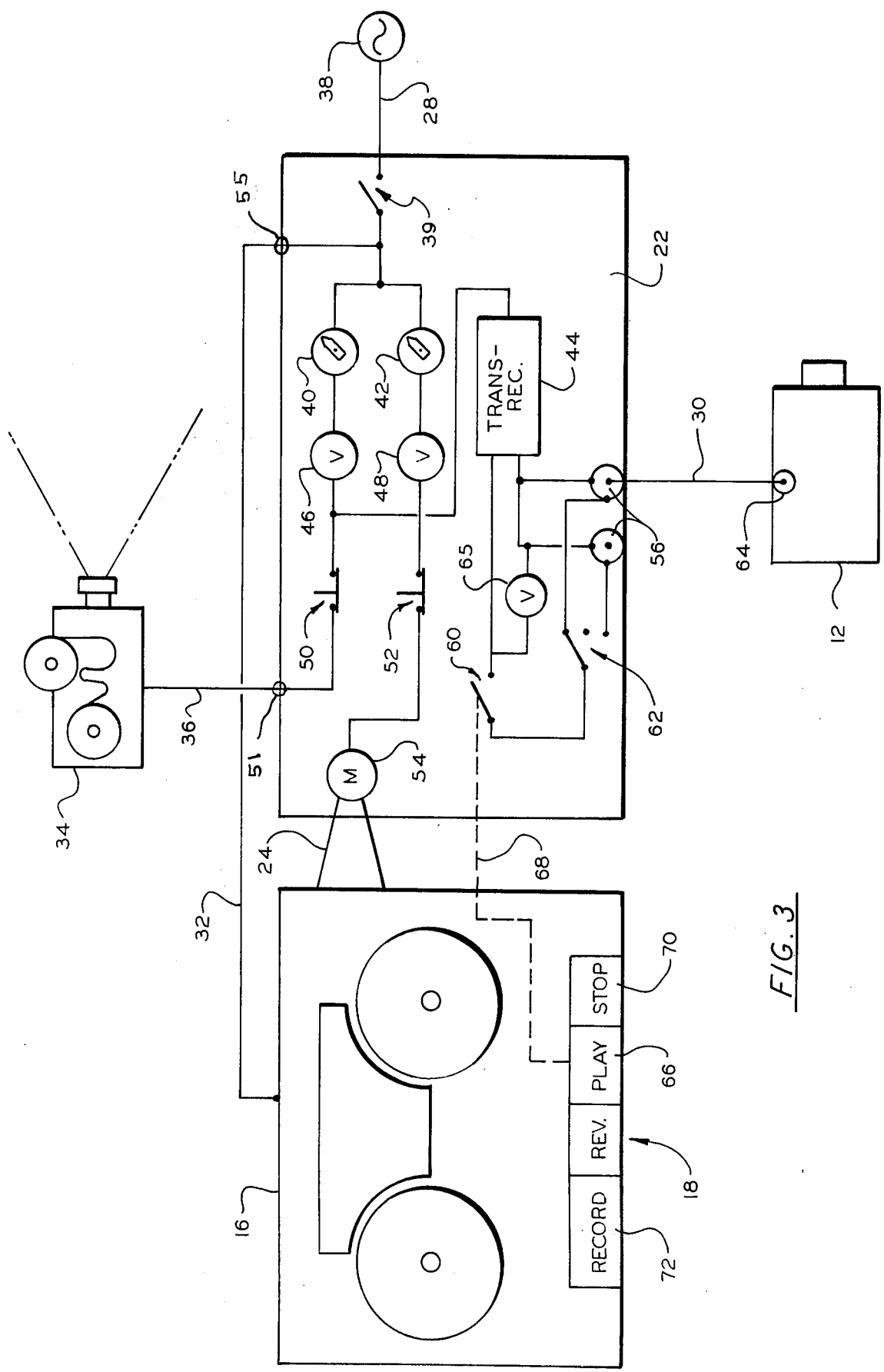
FIG. 3 is a partly schematic, partly diagrammatic illustration of a first disclosed form of the entire system.

Details of the synchronizing system are shown in FIG. 3. The AC source, schematically indicated by reference numeral 38, is connectd to unit 22 by line 28, master switch 39 being provided for turning the power to unit 22 on and off, and thence to two variable AC auto-transformers 40 and 42. Connected across the AC line immediately after auto-transformers 40 and 42 are AC voltmeters 46 and 48, respectively. The auto-transformers are selectively adjustable to vary line current between, for example, 0 and 132 volts. The voltmeters may have a scale range, for example, of 0 to 150 volts.

After voltmeter 46 the AC supply is connected through switch 50 to receptacle 51 for cord 36 of projector 34. After voltmeter 48 the supply is connected through switch 52 to motor 54 which serves as the tape drive motor, being connected to the idler wheel within unit 16 by belt 24 as previously mentioned. The AC supply is also connected to receptacle 55 on unit 22 for receiving a plug on line 32, thus connecting the sound system of tape unit 16 to AC power.

AC adapter 44 is connected to the AC supply after voltmeter 46 and is a commercially available unit having a rectifier for converting the current from AC to DC and a transformer for stepping the voltage down to the level appropriate for operation of camera 12. DC voltmeter 65 may be connected across the DC line as indicated to provide a reading of the actual voltage provided for camera operation. Voltage may be adjusted, if necessary, by altering the AC input voltage through selective setting of auto-transformer 40. One terminal of the DC supply is connected directly to one side of each of jacks 56, preferably comprising subminiature phone jacks, and the other terminal is connected through switches 60 and 62 to the other side of one or the other of the jacks. Cord 30, having a plug at each end, is connected to one of jacks 56 at one end to a similar jack 64 on camera 12 at the other. Jack 64 may be easily and cheaply installed on virtually any battery-operated camera; alternatively alligator clips on the ends of cord 30 may be attached directly to the battery terminals for providing power to operate the film and shutter drive of camera 12 in the manner indicated. The two sides of jack 64 are connected across the DC motor which drives the film and shutter of camera 12 in conventional fashion. Connection of camera 12 in the indicated manner provides a constant voltage level to insure filming at a constant frame rate.

Switches 50 and 52 are preferably momentary, push-button switches, biased in the closed position, which may be individually depressed by an operator to interrupt power to either projector 34 or tape drive motor 54 during operation thereof, as described later. Switch 60 is preferably a microswitch mechanically connected to "Play" key 66 of unit 16, as indicated by dotted line 68, and is moved to and held in the closed position by depression of key 66. Switch 62 is a three-position selector switch which may be selectively positioned to connect the DC supply to either of jacks 56, or at a position wherein both jacks are disconnected.

Although both camera 12 and projector 34 are shown connected to adapter unit 22 in FIG. 3, it will be understood, of course, that only one or the other will be in use at any given time. In filming a movie and recording sound, camera 12 and tape unit 16 are located with fresh reels or cassettes of film and tape, and each connected in the indicated manner to unit 22. A synchronizing signal may be recorded prior to the commencement of filming and recording on the beginning of the tape if there is a possibility that the playback may start at other than a known initial position. For example, the signal may be a series of audible "beeps", a count-down, or some other signal which will permit the operator to set the tape at a predetermined starting position. The operator initiates operation of the tape unit by pushing "Play" key 66 and listens for the pre-recorded cue, e.g., five evenly spaced "beeps". At the fifth "beep" the operator immediately pushes "stop" key 70 and the tape is in its initial position. Conventional tape cassettes are normally always rewound to the same initial position and thus may be started from such position without an audible synchronizing signal.

A visual cue is likewise provided on the movie film for establishing the initial position at which filming is synchronized with sound recording. This may be provided in any convenient manner, as by photographing at the beginning of the reel a clock hand moved to a zero position.

At the beginning of filming and sound recording, the camera and tape unit are started simultaneously with both film and tape at their initial positions indicated by the visible and audible cues thereon. The normal camera operating lever is locked or held in the operating position so that the switch operated thereby is always closed. To initiate filming and recording, "play" key 66 and "record" key 72 are simultaneously depressed. "Play" key 66 operates mechanism within tape unit 16 in conventional fashion to engage the mechanism by which the tape is driven by motor 54 over the recording head. Depression of "play" key 66 also closes switch 60, thereby providing power to the motor of camera 12, switch 62 having been previously positioned as shown in FIG. 3 to connect the DC power to the proper jack 56.

During filming and recording, the voltage at which motor 54 is being operated is noted from volmeter 48. This is set at some predetermined voltage by adjustment of auto-transformer 42 prior to commencement of filming-recording. At any time filming and recording is to be terminated, the operator depresses "stop" key 70, which releases both "play" key 66 to open switch 60 and stop the camera, as well as releasing the tape drive mechanism. Depression of "stop" key 70 also releases record key 72 to disconnect the sound and recording stage from the power supply. It is important to note that the use of "stop" key 70 will not only terminate both filming and recording, but will do so by abruptly stopping both camera and tape drives. Thus, there is no "coasting" of the tape, and upon resumption of filming and recording by again depressing the record and play keys simultaneously the two will remain in synchronization. The equipment may be moved to a new location and connected to a different AC source between scenes if desired, with the level of voltage supply to motor 54 being adjusted to the same level by means of auto-transformer 42 and voltmeter 48. Obviously, a DC source such as a battery pack with a conventional inverter to produce AC power could be used instead of AC source 38 for field operation.

When the flim and/or tape are expended, the film is developed in the usual manner and may be displayed from any standard silent movie projector which accepts this size of film. The projector and tape unit are connected to unit 22 as indicated in FIG. 3, with the recorded tape loaded in unit 16 and the film in projector 34. Tape unit 16 is started by depressing "play" key 66 and the tape is stopped in its initial position, as indicated by the audible cue. This step may be omitted, of course, if the tape is in a cassette which always starts at the same initial tape position. The projector is started by moving the usual lamp-drive switch on the projector itself to the "on" position and the film is run to its initial position. When the operator observes the visual cue indicating initial film position, he again depresses "play" key 66, thereby starting playback of the tape in synchronism with projection of the film. The voltage levels to the projector and tape unit are adjusted to predetermined levels required to maintain substantial synchronization of operating speeds prior to starting of either.

The particular voltage levels required to achieve substantial synchronization may require some experimentation with the equipment used since "rated" speeds of projectors and cameras are often not the actual speeds at which the apparatus operates at rated voltage. That is, although virtually all amateur movie cameras and projectors are rated to operate at a normal speed of 18 frame per second. Very often the speed of one or both will be some other value, either above or below 18 frames per second.

As the movie is taken and the second recorded, it is preferred that the voltage on voltmeter 46 be set at 120v and then on voltmeter 48 at 100v. This provides ample AC power to adapter 44 for producing a constant 6vDC output for operation of camera 12; the voltage driving motor 54 is set at approximately 10v less than that which will produce maximum motor speed, thereby allowing for either increase or decrease in the speed of tape drive on playback. As the movie is projected and the sound played back, it is preferred that voltmeter 46 again be set at 120v which will produce a constant rate of projection (frames per second). As the recorded sound is played back, voltmeter 48 is again set at 100v. If this results in an out-of-synch condition due to the movie running ahead of the sound, auto-transformer 42 is adjusted to increase the voltage to motor 54 by one or two volts. The operator then opens switch 50 to interrupt power to projector 34 until the movie and sound are again synchronized. The adjustment of auto-transformer 42 and opening of switch 50 is repeated, if necessary, until the movie and sound are running in substantial synchronization. The reading on voltmeter 48 is noted and in all subsequent uses of the same equipment should be used as the initial setting for the input voltage to motor 54, thereby providing substantial synchronization of film projection and sound playback from the outset.

The procedure is reversed, of course, if it is found that the sound is running ahead of the movie. That is, auto-transformer 42 is adjusted to lower the reading on voltmeter 48, thus decreasing the speed of motor 54, and switch 52 is opened to interrupt temporarily the power to the motor until sound and movie are running in substantial synchronization. The voltage setting is noted and used as an initial setting in subsequent operation of the same apparatus.

Thus, substantial synchronization may be achieved by setting the input voltage to camera and projector (i.e., the reading on voltmeter 46) at 120 volts both when filming when projecting. The voltage to motor 54 is set at 100 volts during filming and recording, and at an optimum setting greater than 100 volts if the projector has an actual frame rate greater than that of the camera, or less than 100 volts if the actual frame rate of projection is less than that of filming. The tape is preferably driven at a rate in the vicinity or 6 or 7 inches per second, rather than at the more commonly used slower speeds, whereby the necessary adjustments in drive motor speed will not produce objectionable changes in pitch upon playback. The operator may from time to time during projection and playback adjust synchronism, when and if drifts tending to create an out-of-synch condition occur, by temporarily interrupting power to either the tape drive motor or the projector.

It should be noted that provision of two jacks 56 and selection switch 62 allows continuous filming of a scene by switching instantly to a second camera. The tape normally will record for a substantially longer period than the filming time of a single reel or cassette of film, thereby allowing the film from the two cameras to be spliced and projected continuously with the recorded sound. Also, in the illustrated embodiment, a change in input voltage to the tape drive motor does not affect input voltage to the recording and sound stage of the tape unit.

Figure 4:
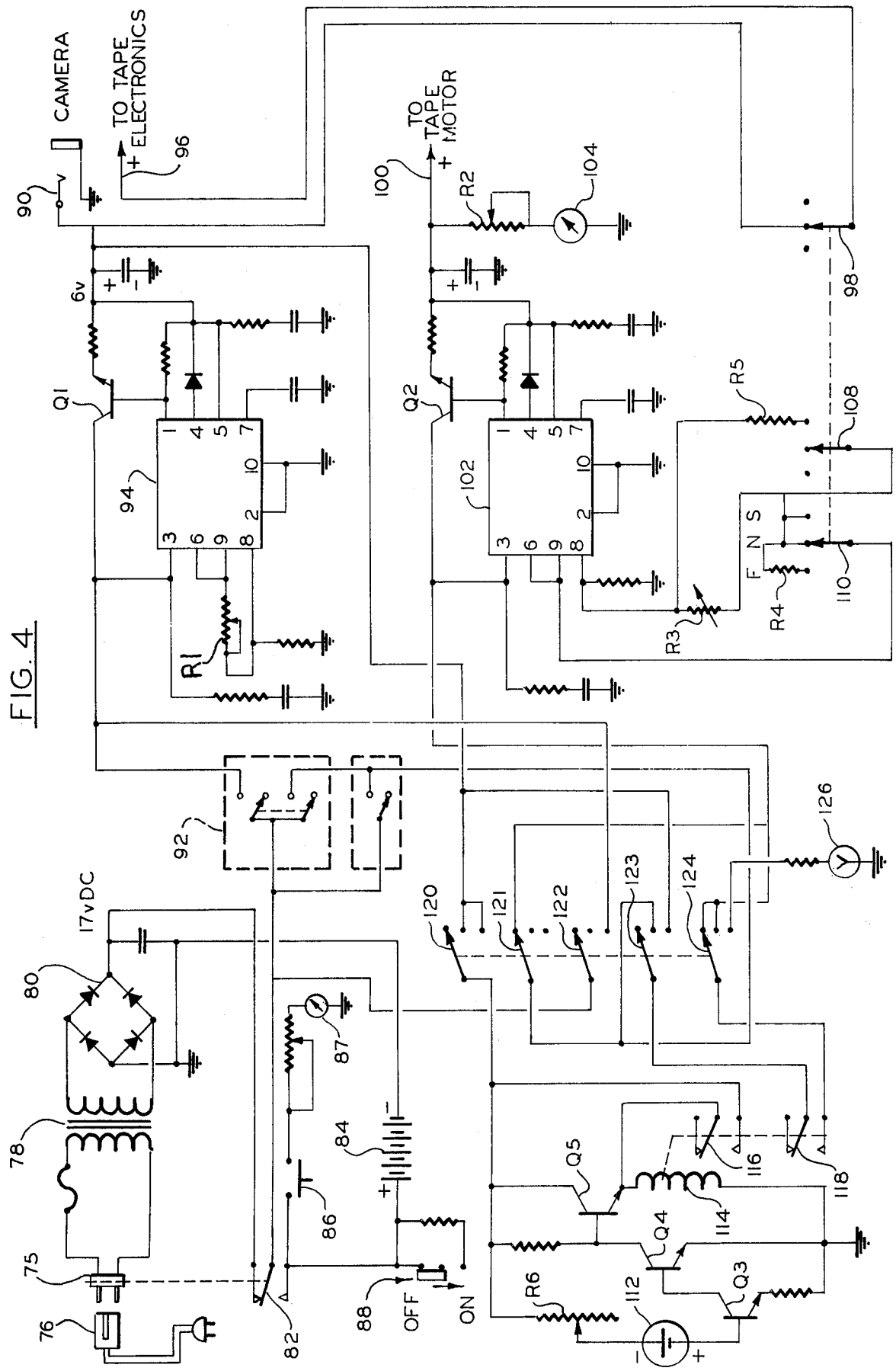
FIG. 4 is a schematic diagram of a second form of circuitry which may be employed alternatively to that of FIG. 3.

FIG. 4 illustrates schematically another form of the invention wherein the projector need not be included in the circuit of the synchronizing system. Rather than interrupting power to either the projector or tape drive motor as in the previous embodiment, synchronism is restored by either slowing down or speeding up the tape drive motor. Also, appropriate circuitry is provided for starting the tape unit drive motor at the proper time automatically rather than manually.

The unit may be operated for filming or playback either from AC hous current, rectified to DC, or directly from a 12 volt DC battery. Plug 75 inserts in wall outlet 76, or other appropriate source of AC power which is rectified to DC at an appropriate voltage level, e.g., 17v by means of transformer 78 and full wave bridge 80. Selector switch 82 is provided to set the unit for either AC or DC operation, and is shown in the AC position. The switch is preferably set automatically to the AC position upon plug 75 being plugged into an AC outlet. For DC operation, battery 84 is connected in the circuit and conventional test and calibration means 86 and recharging means 88 are provided.

Line 90 connects the camera to the power source through transistor Q1 and switch 92, the latter being operated by the on/play button of the tape unit. Conventional integrated circuit 94 is connected to the base of transistor Q1 to control the output voltage thereof. Potentiometer R1 is provided to adjust the output voltage to the nominal operating voltage of the particular camera to be used. This is a one-time adjustment, assuming the unit is always used with cameras of the same voltage, e.g., 6 volts.

The tape unit electronics or sound system is likewise connected to the power source through transistor Q1 and switch 92, via line 96. A further switch contact 98 is provided in the line to the sound system for reasons explained later. Thus, once potentiometer R1 has been set, a predetermined, constant voltage is provided for operation of the camera and tape unit sound system.

The tape unit drive motor is connected by line 100 to transistor Q2, the output voltage of which is controlled by integrated circuit 102. Meter 104, having calibrating potentiometer R2, provides a reference reading of the voltage to the tape motor. Switch contacts 108 and 110 are connected to integrated circuit 102 to affect the bias voltage at the base of transistor Q2 in accordance with their setting on one of three terminals. Contacts 108 and 110 are ganged to one another and to contact 98. The contacts are set on the center terminal, in the position shown, during recording and for normal operation during playback. In this position, the effective resistance across the terminals of integrated circuit 102 is established by variable resistor R3, which is adjustable for calibration purposes so that the output voltage of transistor Q2 is exactly at the level required to operate the tape motor at nominal speed. Movement of the contacts to the terminals on the left adds resistor R4 in series with resistor R3, thereby increasing the effective resistance across the input terminals of integrated circuit 102, changing the output thereof to the base of transistor Q2 and reducing the voltage to tape motor 100. Moving the switch contacts to the terminals on the right provides a path through resistor R5, having a value, e.g., one-tenth that of resistor R3, and contact 108, thereby lowering the effective resistance across the integrated circuit and raising the voltage level to the tape motor. Thus, the tape motor drive voltage is altered by fixed increments in accordance with the setting of switch contacts 108 and 110. Contact 98 completes the circuit to the tape electronics only when on the center terminal, i.e., only when the tape motor is running at nominal speed. Otherwise the sound system is disconnected from the power source, thus avoiding audible changes in pitch for the short times that the motor is running faster or slower than nominal speed.

The tape drive motor may be connected to the power source through a manually operable switch, as in the previously described embodiment, if playback is to be started manually in conjunction with visually observed cues on the film. As an additional feature, however, FIG. 4 illustrates an example of means for automatically starting the tape unit in synchronism with projection of the film. A photosensitive device such as a selenium solar cell 112 is connected through an amplifying circuit providing by transistors Q3, Q4 and Q5 to coil 114 of a relay having two sets of contacts 116 and 118. Five switch contacts 120, 121, 122, 123 and 124 are ganged for movement between three terminals. The switch is placed with the contacts on the upper terminals, in the position shown in FIG. 4, when filming and/or recording, and when the tape unit is used as a sound system only, i.e., without accompanying film projection.

The contacts are placed on the lower terminals prior to starting projection of the film and playback of the tape in order to adjust sensitivity of the circuit to the proper level. This is done with ambient light at the level it will be during projection. The tape unit does not start because the motor drive is connected to the power source through the upper terminal of switch contact 121 and the upper and middle terminals of contact 124. Thus, with all contacts on the lower terminals the motor cannot receive power.

Coil 114 is connected to the 6v output of transistor Q1 through switch contact 120 and transistor Q5. The current flow through transistor Q5 is insufficient to actuate the relay until the bias voltage applied to the base has been adjusted to a null value. The positive side of cell 112 is connected to the base of transistor Q3, and the negative side to potentiometer R6. A manual control knob, described later, is provided for potentiometer R6 and is initially set to provide the lowest resistance value. It is gradually increased by slowly turning the control knob until a null condition is reached, which is a function of the voltage produced by cell 112 in accordance with the ambient light level. At this time current flow through transistor Q5 to coil 114 will actuate the relay, thereby connecting light-emitting diode 126 to the 6v power supply through switch contact 124, relay contacts 118, and switch contact 123. Potentiometer R6 is then backed off slightly, whereby at least some light above the ambient level will be required in order for cell 112 to generate sufficient voltage to again reach the null condition.

Switch contacts 120-124 are then placed on the center terminals, in the "automatic start" position, the tape unit on play switch 92 is closed, and the projector is started. The film leader is opaque, or of high density, except for a short distance before the first picture frame at which a transparent, or much lower density, section is provided. Cell 112 is positioned to receive light reflected from the projection screen. Thus, as the transparent section of leader passes the projector lens, the increased light level produces additional voltage output from cell 112. As soon as the null condition is reached, current flow through transistor Q5 will be sufficient to actuate the relay. The tape drive motor will then be connected to the power supply through switch contact 124, relay contact 118, switch contact 123 and on/play switch 92 which, as previously mentioned, is placed in the closed position prior to starting the projector. Thus, the tape drive begins concurrently with projection of the first picture frame and the sound and projection are automatically started in synchronism. As projection and playback continue, any condition tending to place the sound ahead of or behind the projection is corrected by momentarily placing switch contacts 108 and 110 on either the right or left terminals to slow down or speed up tape drive, as required to restore synchronism. Relay contacts 116 latch the coil to the 6v output of transistor Q1 so the unit will continue to operate, once activated, irrespective of the light level on photocell 112.

Figure 5:
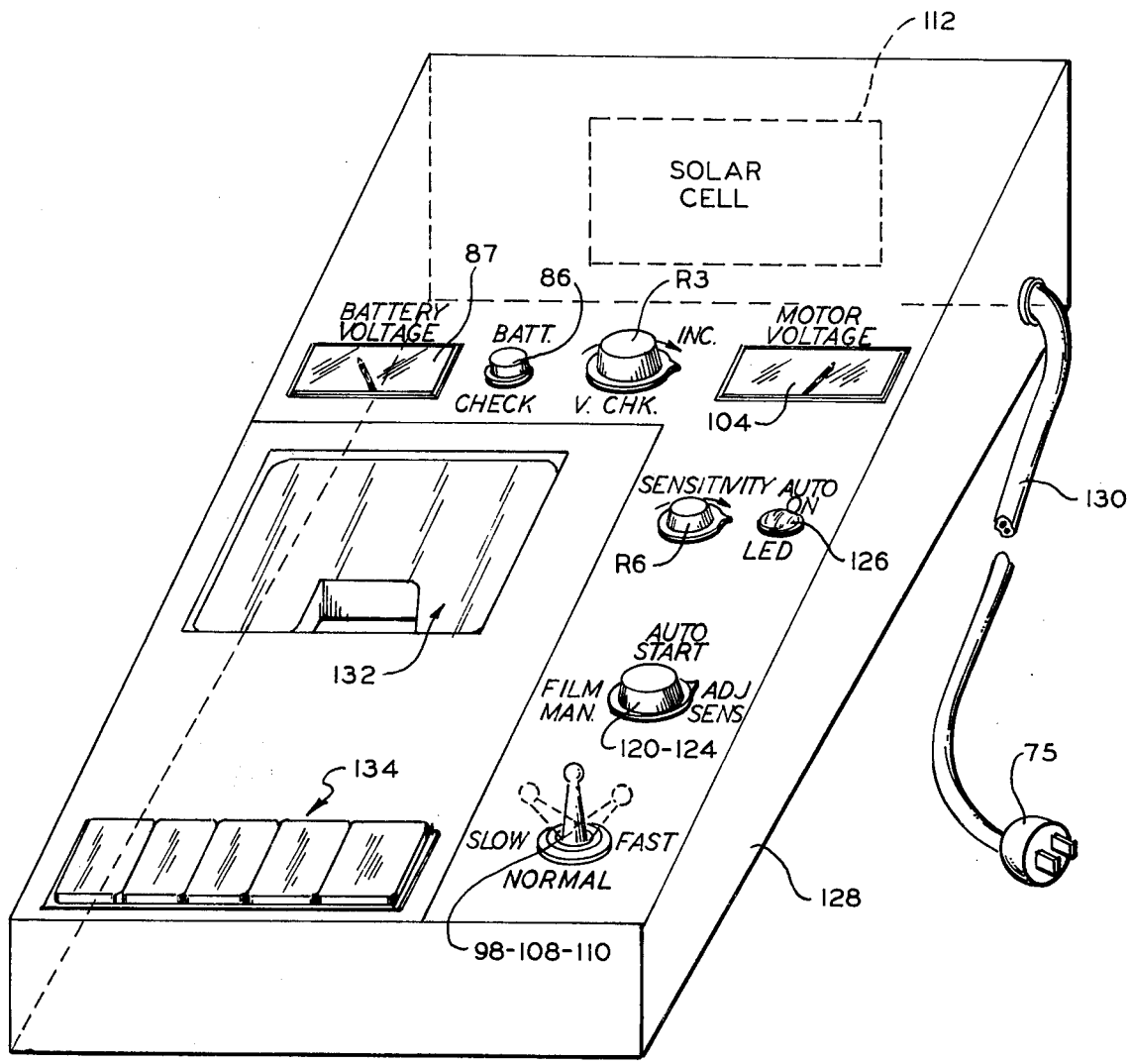
FIG. 5 is a perspective view of an example of the external appearance of the case enclosing the tape unit and adapter circuitry.

In FIG. 5 is shown an example of the external appearance of a case 128 enclosing the tape unit and synchronizing system. Plug 75 is shown, for connection to a wall outlet or other AC source, with cord 130 connecting it to cabinet 128. The tape casette is placed in receptacle 132 and buttons 134 operate the tape unit control switches in conventional manner. Reference numerals used for the other elements shown in FIG. 5 are the same as those used for the corresponding elements shown schematically in FIG. 4. Battery voltage is indicated on meter 87 upon pressing switch button 86. Potentiometer R3 is adjusted by turning the indicated knob to set motor voltage, as observed on meter 101, to the proper level. Switch contacts 120–124 are cooperatively moved between the three terminals, with appropriate indicia provided on case 128 adjacent the control knob for these contacts. A three-position toggle control is provided for cooperative movement of ganged contacts 98, 108 and 110 to their three terminals, and is preferably spring biased to the center or "normal speed" position. Photocell 112 is arranged on the side of case 128 which is positioned toward the projection screen during projection and playback.

What is claimed is:

1. A system for synchronizing projection of a motion picture with playback of sound recorded on a medium separate from the film, said system comprising, in combination:
   a. a moving picture projector;
   b. a first line providing electrical power from a source to operate said projector;
   c. a playback unit including an electric motor for driving the record medium past a stationary pickup means and an electrical sound system for producing audible sound from the movement of said medium past said pickup means;
   d. a second line providing electrical power from a source to operate said sound system;
   e. a third line connected between said motor and a source other than through said sound system for providing electrical power to operate said motor;
   f. manually operable first switch means in said first line for interrupting power to said projector to allow said playback unit to operate at a faster rate than said projector for a selected time interval until synchronism between the motion picture and the sound is restored; and
   g. manually operable second switch means in said third line for interrupting power to said motor to allow said projector to operate at a faster rate than said playback unit, without interruption of the electrical power operating said sound system, for a selected time interval until synchronism between the motion picture and the sound is restored.

2. The invention according to claim 1 and further including means for selectively adjusting the voltage provided to said motor.

3. The invention according to claim 2 and further including means for selectively adjusting the voltage provided to said projector.

4. The invention according to claim 1 wherein said first and second switch means comprise momentary push-button switches.

5. A system for simultaneously filming a motion picture and recording sound on a record medium separate from the film, and for projecting the motion picture and playing back the recorded sound in synchronism, said system comprising:
   a. a first line providing electrical power from an AC source;
   b. a recording and playback unit including an electric motor for driving a record medium past a stationary transducer for recording on and picking up from said record medium audible sounds, an electrical system for converting sound to electrical signals and vice versa, and a plurality of switches for starting and stopping movement of said record medium and operation of said electrical system for recording or playing back;
   c. a movie camera;
   d. a movie projector;
   e. means for converting AC power from said source to DC power at a voltage level appropriate to operate said camera;
   f. a second line connecting said camera to said converting means;
   g. a first switch in said second line which is closed in response to closure of one of said plurality of switches which initiates movement of said record medium for recording, and is opened in response to closure of another of said plurality of switches which stops movement of said record medium, whereby operation of said camera is started and stopped simultaneously with starting and stopping of recording on said record medium;
   h. a third line connecting said electrical system to said first line;
   i. a fourth line connecting said movie projector to said first line; and
   j. a fifth line connecting said motor to said first line.

6. The invention according to claim 5 and further including second and third switches in said fourth and fifth lines, respectively, for separately interrupting power to said projector and motor for selected time intervals.

7. The invention according to claim 5 and further including means for selectively varying the voltage provided to said motor.

8. An adapter unit for use with a motion picture camera and projector and a sound recording and playback unit to synchronize projection and playback of the movie and sound which were recorded simultaneously, said unit comprising:
   a. a first line providing power from an AC source;
   b. means for converting AC power from said source to DC power of appropriate voltage for operating a movie camera;
   c. a first receptacle at which said DC power is available;
   d. a first switch between said first receptacle and said converting means;
   e. a second line connected between said first line and a second receptacle providing AC power at said second receptacle for operation of a movie projector;
   f. a third line connected between said first line and a motor adapted to drive a record medium on which sound is recorded;
   g. a second switch in said second line selectively operable to interrupt AC power to said second receptacle to allow the record medium to operate at a faster rate than the projector for a selected time interval until synchronism between projection of the motion picture and playback of the sound recording is restored; and
   h. a third switch in said third line selectively operable to interrupt power to said motor to allow the projector to operate at a faster rate than the record medium for a selected time interval until synchronism between playback of the sound recording and projection of the motion picture is restored.

9. The invention according to claim 8 and further including a third receptacle and a selector switch positionable to connect said converting means to either of said first and third receptacles, with said first switch interposed therebetween.

10. The invention according to claim 8 and further including means for selectively adjusting the voltage in said third line provided as an input to said motor.

11. A system for manually restoring synchronism of projection of a motion picture film with playback of sound recorded on a record medium separate from the film, said system comprising:
   a. a playback unit including an electric motor for driving the record medium past a stationary pickup means and an electrical sound system for producing audible sound from the movement of said medium past said pickup means;
   b. a first line providing a regulated voltage to operate said sound system;
   c. a second line connected between said motor and source other than through said sound system for providing a regulated voltage to operate said motor; and
   d. manually operable switch means selectively movable to vary the speed of said motor between rates both faster and slower than the normal speed thereof for selected time intervals to restore synchronism between projection of the motion picture and playback of the sound recording without affecting said regulated voltage operating said sound system.

12. The invention according to claim 11 and further including means responsive to movement of said switch means to disconnect said sound system from its voltage supply when said motor is operating at other than normal speed.

13. The invention according to claim 11 wherein movement of said switch means varies the effective resistance across a pair of terminals, thereby varying the voltage provided to said motor.

14. The invention according to claim 13 wherein said pair of terminals comprise inputs to an integrated circuit having an output providing a bias voltage for a transistor through which said second line passes.

15. A system for manually restoring synchronism of projection of a motion picture film with playback of sound recorded on a record medium separate from the film, said system comprising:
   a. a playback unit including an electric motor for driving the record medium past a stationary pickup means and an electrical sound system for producing audible sound from the movement of said medium past said pickup means;
   b. a first line providing a regulated voltage to operate said sound system;
   c. a second line connected between said motor and source other than through said sound system for providing a regulated voltage to operate said motor;
   d. manually operable switch means selectively movable to vary the speed of said motor between rates both faster and slower than the normal speed thereof for selected time intervals to restore synchronism between projection of the motion picture and playback of the sound recording without affecting said regulated voltage operating said sound system; and
   e. light responsive means for connecting said first and second lines with a power source in response to a predetermined increase in the intensity of light incident on a photosensitive element of said light responsive means.

16. The invention according to claim 15 wherein said light responsive means includes a relay constructed and arranged for actuation in response to electrical parameters of said photosensitive element upon incidence thereon of said predetermined increase in light intensity.

17. The invention according to claim 16 wherein said light responsive means include means for manually adjusting electrical parameters to change the intensity of light to which said photosensitive element is responsive to actuate said relay.

18. The invention according to claim 17 wherein said adjusting means comprise a potentiometer and a visual indicating device.

* * * * *